Oct. 15, 1940.  A. N. GEORGE  2,217,677

FISH BAIT

Filed Dec. 16, 1938

INVENTOR
*Achilles N. George.*
BY
*Harness, Dickey & Pierce.*
ATTORNEYS.

Patented Oct. 15, 1940

2,217,677

UNITED STATES PATENT OFFICE

2,217,677

FISH BAIT

Achilles N. George, Detroit, Mich.

Application December 16, 1938, Serial No. 246,015

7 Claims. (Cl. 43—42)

This invention relates to fish bait or artificial lures, the principal object being the provision of such lure in the form of a frog or the like and so constructed and arranged that when drawn through the water in the proper manner the legs thereof may be caused to move in a more or less natural or lifelike swimming motion.

Objects of the invention include the provision of a fish bait or lure in the form of a frog or the like having articulated legs so constructed and arranged that when the bait is drawn through the water by intermittent pulls the legs will be caused to retract and advance in a more or less lifelike manner; the provision of a lure of the type described provided with a pair of legs at the rear end thereof, each leg being formed of a plurality of parts pivotally connected together and to the body portion of the bait; the provision of a lure of the type described in which each leg comprises a foot portion and the foot portion of each leg is fixed with relation to the foot portion of the other leg; the provision of a construction as above described in which spring means are provided for constantly urging the leg portion toward contracted or folded position; the provision of a construction as above described in which the feet portions of the legs are so constructed and arranged as to exert a drag in opposition to a force tending to move them through the water, the drag being sufficient to cause the legs to straighten out in opposition to the spring means when the lure is given a pull while in the water; the provision of a construction as above described in which the drag of the feet portions is accentuated or is effected substantially entirely by means of a drag element carried by the feet portions of the bait; and the provision of a fish lure of the type described that is simple in construction, economical to manufacture and lifelike in action.

The above being among the objects of the present invention, the same consists in certain novel features of construction and combinations of parts to be hereinafter described with reference to the accompanying drawing, and then claimed, having the above and other objects, in view.

In the accompanying drawing which illustrates a suitable embodiment of the present invention and in which like numerals refer to like parts throughout the several different views.

Figure 1:
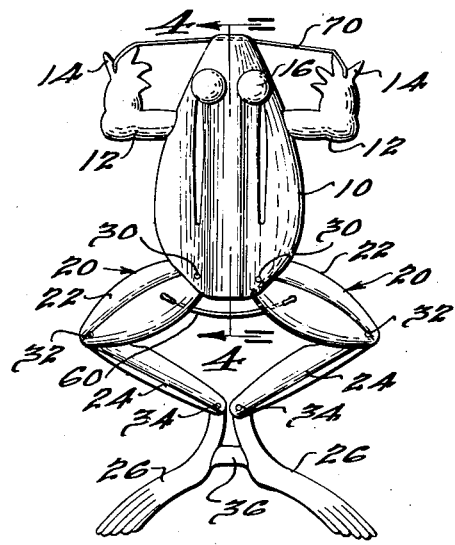
Fig. 1 is a plan view of my improved fish bait or lure shown in its normal rest position, that is with the legs thereof in folded or contracted position.

While a fish bait or lure constructed in accordance with the present invention may be made to simulate various animals, reptiles or amphibians having articulated legs, because of the fact that live frogs are themselves an excellent fish bait and artificial frogs are equally popular with fishermen as a lure, the particular embodiment of the present invention shown by way of illustration is in the form of a frog, the application of the invention in the simulation of other animals, reptiles or amphibians being made apparent to those skilled in the art thereby. It will be understood that artificial bait or lures made in accordance with the present invention may be of any desired size depending upon the use to which it is desired to put them and the size of fish being sought. In other words the bait or lure may be of a relatively small size simulating the frog recently transformed from the tadpole stage and adapted to be employed in connection with relatively light fly rods. On the other hand, they may be constructed of a size corresponding with an adult frog for the purpose of fishing for bass, pike and the like and to be cast in the same manner as any usual bass or pike plug. Obviously they may be constructed to represent a frog of any desired stage intermediate the two above described stages of development.

Referring to the accompanying drawing it will be noted that the artificial frog bait there shown includes a main body portion 10 simulating in shape and preferably in coloring the body of a frog. Preferably although not necessarily a pair of front leg portions 12 are mounted on the main body portion 10 and preferably these are made rigid and preferably integral with the main body portion 10. In order to more closely simulate the shape of a swimming frog the front legs 12 are shown in forwardly bent position with the forward terminal portions thereof shaped to represent fingers 14. Protuberances 16, simulating eyes, are preferably provided on the main body portion as indicated.

A pair of legs, each indicated generally at 20 are movably secured to the rear portion of the body 10. Each leg comprises a thigh portion 22, a calf portion 24, and a foot portion 26, each of these portions being shaped to simulate the corresponding natural parts of a frog.

Figure 3:
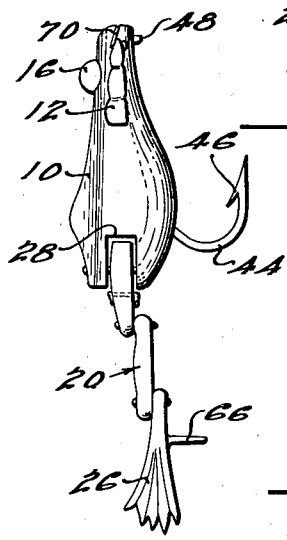
Fig. 3 is a side elevational view of the bait with the legs in folded position as illustrated in Fig. 1.

The rear end of the main body portion 10 is provided with a transverse slot 28 as best illustrated in Fig. 3, and the forward end of each thigh portion 22 of each leg 20 is received within such slot on the corresponding side of the main body portion 10 and is pivotally secured therein by means of a pin 30. The rear end of each thigh portion 22 of each leg 20 is pivotally connected to the forward end of the corresponding calf portion 24 of such legs by means of a pin 32. The rear end of each calf portion 24 of each leg 20 is pivotally connected to the forward end of the corresponding foot portion 26 for such legs by means of a pin 34. Preferably, as illustrated in Fig. 3, the forward ends of the calf portions 24 are located below the rear portions of the thigh portions 22 and the forward ends of the foot portions 26 are located below the rear ends of the calf portions 24, this for the purpose of insuring the foot portion 26 being submerged in operation. The foot portions 26 are rigidly secured together and while their forward portions may be formed so as to be transversely continuous, they are preferably separated not only to more closely simulate a living frog but also to provide separate and distinct areas for pivotal connection to the corresponding calf portion 24. In such case the foot portions 26 are joined together by a bar 36 preferably formed integrally therewith.

Figure 4:
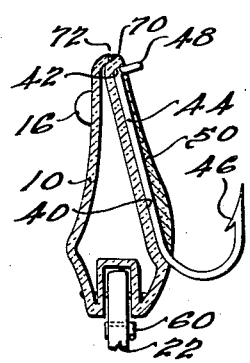
Fig. 4 is a fragmentary sectional view taken centrally of the body of the bait as on the line 4—4 of Fig. 1; and, Fig. 5 is a fragmentary vertical sectional view taken transversely through the body of the bait as on the line 5—5 of Fig. 2.

The bait thus described may be formed of any suitable material such as wood, rubber, plastic or the like. Its weight may be such as to render it buoyant in water or such as to permit it to sink therein. Where constructed of wood it will ordinarily be buoyant unless suitably weighted and when constructed of rubber, plastic, or the like will ordinarily be non-buoyant unless the main body portion thereof is formed hollow. In the present case it may be assumed that the bait is formed from a suitable plastic, this being preferable inasmuch as plastics are available in any suitable color and in forming the bait shown of a suitable color plastic the finish will remain substantially permanent. Accordingly, the main body 10 is shown of hollow construction as illustrated in Figs. 4 and 5 in order to render the same buoyant in water.

While one or more hooks, either individually or in gangs, may be secured to the bait described for the usual purpose, it is preferable to employ a single hook and in such case to arrange such hook that the eye thereof may be utilized for connection to a line or leader in conventional manner for the purpose of casting the bait and/or drawing it through the water. Where the bait is formed of a moldable material such as rubber, plastic or the like the hook may be imbedded in the bait during the molding operation or may be secured thereto after the molding operation has been completed. It is assumed that the latter step will be followed in the embodiment shown and for that purpose the underside of the main body portion 10 is shown as being provided with a longitudinally extending groove 40 in the bottom surface thereof, the groove preferably terminating short of the forward end of the bait so as to form a shoulder indicated at 42 in Fig. 4.

The hook 44 is of a more or less conventional type having the usual barb 46 and eye 48, the eye 48 in this case, however, being bent into substantially perpendicular relationship to the shank thereof. The hook is inserted in the slot 40 in the manner illustrated in Fig. 4, that is with the bend of the hook adjacent the eye 48 abutting the shoulder 42, and the barb 46 located preferably below the body. A mass of suitable cement 50 or other suitable material is inserted into the groove 40 around the shank portion of the hook therein, to completely fill the balance of the groove 40 and to make a smooth joint across the corresponding surface of the bait.

It will be recognized from the above that the line or leader will be secured directly to the eye 48 and consequently when a fish is caught upon the hook 44 all of the strain of landing the fish is confined to the hook and the body of the bait itself is relieved thereof. Furthermore because of the fact that the bent eye portion of the hook rests against the shoulder 42, the material 50 is not relied upon entirely in maintaining the assembled relationship of the hook 44 and body 10 when the bait is being retrieved, cast or the like.

Spring means are employed for constantly urging the legs 20 toward their contracted or forwardly folded position. While any suitable spring means may be employed for this purpose and arranged in any suitable manner between suitable parts of the legs or between the legs and the body, it has been found that a simple curved spring such as the spring 60 extended between the thigh portions 22 of the legs is amply sufficient for the purpose. The spring 60 is provided with perpendicularly bent end portions which are preferably projected through the thigh portions 22 and their terminal end portions bent over on the other side to prevent displacement.

Figure 2:
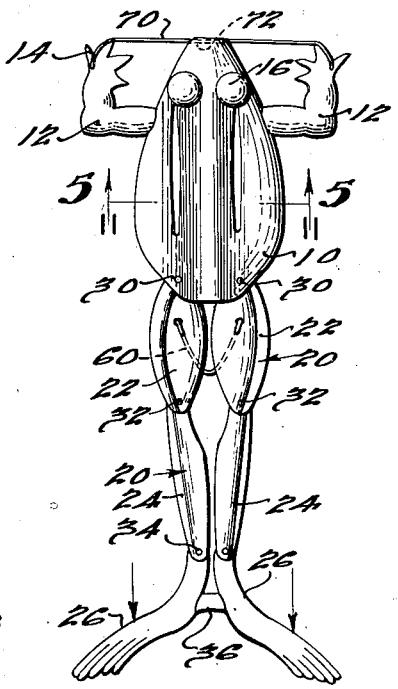
Fig. 2 is a view similar to Fig. 1 but illustrating the legs in straightened or extended position.

The feet proper of the feet portions 26 are preferably directed outwardly away from each other and from the center line of the bait as best illustrated in Figs. 1 and 2 and preferably as illustrated in Fig. 3 made of sufficient vertical dimension so that they will offer a drag to pulling them through the water. To increase this drag they may be exaggerated in size if necessary or desirable.

The effect of the construction above described is as follows. The bait, when lying motionless or substantially so in the water will assume the form illustrated in Fig. 1 with the legs folded upwardly or forwardly under the influence of the spring 60. If the line to which the bait is attached, under such circumstances, is given a forward pull, the main body portion 10 of the bait will, of course, be required to move forwardly under the influence of and at a distance corresponding with the extent of such pull. The feet portions 26, however, because of the drag which they offered to movement through the water and because they are connected to the main body portion 10 through the articulated leg portions 22 and 24 and urged toward normal folded position by the relatively weak spring 60, will have a tendency to remain stationary, and this drag will cause the leg portions of the bait to straighten out as illustrated in Fig. 2, for instance, until such pull on the line is relieved. As soon as such pull is relieved the spring 60 will act to move the legs again to folded position as illustrated in Fig. 1. It will be appreciated that when the leg portions of the bait straighten out as illustrated in Fig. 2 from the position illustrated in Fig. 1 the action of the legs will simulate the propelling stroke of the hind legs of a live frog, and the movement of the legs from the straightened out position illustrated in Fig. 2 to the folded position illustrated in Fig. 1 will simulate the retracting movement of the leg portions of the frog from the position assumed at the end of a swimming stroke to a position ready for the next succeeding swimming stroke. It will also be appreciated that by giving the line alternate jerks and slack during a retrieving movement of the bait, the leg portions of the bait will be made to simulate the swimming movements of the rear legs of a frog in the water. This action, of course, increases the natural effect of the bait and enhances its luring qualities with respect to the game sought.

It has been found that the naturalness of this simulation of the swimming leg movement of a frog is materially enhanced by securing the feet portions 26 together as described as in such case the movement of both legs in unison is insured and inasmuch as the pivot points of the thigh portions 22 with the body and the calf portions 24 with the foot portions 26 are located relatively close together, the effect is similar to that of parallel linkages insuring uniformity of movement of the leg portions of the bait with respect to the longitudinal center line of the bait.

It is also preferable that the feet proper of the foot portion 26 are inclined outwardly and downwardly with respect to the longitudinal center line of the bait as this has the effect, because of the reaction of the feet portions with the water, to depress the rear end of the bait to thus insure complete submergence of the feet portions at all times, and also to render the trim of the bait in the water more life-like when the bait is of the buoyant type.

Because of the fact that it is essential to obtain a material amount of drag of the feet portions 26 in the water in order to insure proper lifelike movement of the legs, it may be desirable under certain circumstances to provide for a drag additional to that provided by the feet proper of the foot portions 26. In such case the connecting bar 36 may be formed to provide a downwardly directed transversely extending baffle or drag 66, as best illustrated in Fig. 3, which may be made of any size necessary to obtain the desired effect as will be readily appreciated.

Where the bait is intended for use in exceptionally weedy water, it may be desirable to take precautions to prevent the forwardly extending front arms 12 from becoming fouled with the weeds. The danger of such fouling may be considerably minimized by providing a guard such as the guard 70 extending between the forward ends of the front arms 12 across the nose portion of the bait. While the guard may take any suitable form it may be conveniently provided by means of a wire, preferably of the spring type, received in a suitable notch such as 72 in the forward end of the main body portion 10 with its opposite ends secured to the forward ends of the arms 12 as illustrated.

Formal changes may be made in the specific embodiment of the invention described without departing from the spirit or substance of the broad invention, the scope of which is commensurate with the appended claims.

What I claim is:

1. An artificial fish bait or lure formed to simulate a frog or the like comprising, in combination, a main body portion and a pair of rear leg portions, said leg portions each being pivotally secured to said main body portion and each comprising a thigh portion, a calf portion and a foot portion, the foot portions of said legs being rigidly connected together, and means constantly urging said leg portions towards folded position.

2. An artificial fish bait or lure formed to simulate a frog or the like comprising, in combination, a main body portion and a pair of rear leg portions, said leg portions each being pivotally secured to said main body portion and each comprising a thigh portion, a calf portion and a foot portion, the foot portions of said legs being rigidly connected together and each including laterally outwardly extending portions serving as drags of constant effect to resist forward movement thereof in water, and means constantly urging said leg portions towards folded position.

3. An artificial fish bait or lure formed to simulate a frog or the like comprising, in combination, a main body portion and a pair of rear leg portions, said leg portions each being pivotally secured to said main body portion and each comprising a thigh portion, a calf portion and a foot portion, the foot portions each including laterally outwardly extending portions serving as drags to resist forward movement thereof in water, and said outwardly extending portions being inclined forwardly and downwardly with respect to the longitudinal center line of said bait whereby to react upon the water when being drawn therethrough to depress the rear end of said bait in the water, and means constantly urging said leg portions towards folded position.

4. An artificial fish bait or lure formed to simulate a frog or the like comprising, in combination, a main body portion and a pair of rear leg portions, said leg portions each being pivotally secured to said main body portion and each comprising a thigh portion, a calf portion and a foot portion, the foot portions of said legs being rigidly connected together, means constantly urging said leg portions towards folded position, and a downwardly directed baffle secured to said foot portions whereby to provide a drag to resist forward movement of said foot portions through said water.

5. An artificial fish bait or lure formed to simulate a frog or the like comprising, in combination, a main body portion and a pair of rear leg portions, said leg portions each being pivotally secured to said main body portion and each comprising a thigh portion, a calf portion and a foot portion, a vertically directed baffle member rigidly securing said foot portions together, and means constantly urging said leg portions towards folded position.

6. An artificial fish bait or lure formed to simulate a frog or the like comprising, in combination, a main body portion and a pair of rear leg portions, said leg portions each being pivotally secured to said main body portion and each comprising a thigh portion, a calf portion and a foot portion, the foot portions of said legs being rigidly connected together, means constantly urging said leg portions towards folded position, front arms including forwardly projecting portions secured to said main body portion, and guard means interconnecting the forward ends of said front arm portions with the nose portion of said bait.

7. An artificial fish bait or lure formed to simulate a frog or the like comprising, in combination, a main body portion and a pair of rear leg portions, said leg portions each being pivotally secured to said main body portion and each including a thigh portion and a calf portion pivotally connected together, and a foot portion common to both said leg portions and pivotally connected to the free end of the calf portion thereof.

ACHILLES N. GEORGE.